United States Patent
Maciel et al.

(10) Patent No.: US 8,937,970 B2
(45) Date of Patent: Jan. 20, 2015

(54) RESOURCE ALLOCATION FOR MINIMUM SATISFACTION GUARANTEES IN MULTI-SERVICE AND MULTI-ANTENNA NETWORKS

(71) Applicant: Telefonaktiebolaget LM Ericsson (publ), Stockholm (SE)

(72) Inventors: Tarcísio Ferreira Maciel, Fortaleza (BR); Francisco Rodrigo Porto Cavalcanti, Fortaleza (BR); Walter Cruz Freitas Junior, Fortaleza (BR); Francisco Rafael Marques Lima, Fortaleza (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 179 days.

(21) Appl. No.: 13/746,930

(22) Filed: Jan. 22, 2013

(65) Prior Publication Data
US 2014/0133453 A1    May 15, 2014

Related U.S. Application Data

(60) Provisional application No. 61/726,201, filed on Nov. 14, 2012.

(51) Int. Cl.
| H04J 3/16 | (2006.01) |
| H04W 4/00 | (2009.01) |
| H04J 4/00 | (2006.01) |
| H04L 5/00 | (2006.01) |
| H04W 72/12 | (2009.01) |

(52) U.S. Cl.
CPC ......... *H04L 5/0064* (2013.01); *H04W 72/1273* (2013.01); *H04W 72/1236* (2013.01)
USPC ............................. 370/437; 370/330; 370/436

(58) Field of Classification Search
USPC .......... 370/278, 282, 329, 330, 431, 436, 437
See application file for complete search history.

(56) References Cited

U.S. PATENT DOCUMENTS

| 2006/0121946 A1* | 6/2006 | Walton et al. ................. 455/561 |
| 2009/0103488 A1 | 4/2009 | Zhu et al. |
| 2009/0323541 A1* | 12/2009 | Sagfors et al. ................ 370/252 |

(Continued)

OTHER PUBLICATIONS

Furuskär, A., et al. "Radio Resource Sharing and Bearer Service Allocation for Multi-Bearer Service, Multi-Access Wireless Networks," PhD thesis, Royal Institute of Technology (KTH), Radio Communication Systems, Apr. 2003, Stockholm, Sweden.

(Continued)

*Primary Examiner* — Redentor Pasia
(74) *Attorney, Agent, or Firm* — Murphy, Bilak & Homiller, PLLC

(57) ABSTRACT

Radio resource allocation techniques for MIMO systems are disclosed, wherein SDMA groups that should be multiplexed on each frequency chunk in order to maximize the total downlink data rate are selected, while guaranteeing that a specified minimum number of flows from each service have their instantaneous QoS demands fulfilled. The disclosed techniques include an unconstrained maximization procedure, in which resources are initially allocated to data flows for each of several data services, followed by a reallocation procedure in which resources are reallocated to satisfy minimum satisfaction constraints for each data service.

12 Claims, 7 Drawing Sheets

(56) References Cited

U.S. PATENT DOCUMENTS

2010/0311452 A1* 12/2010 Li et al. .................... 455/509
2011/0230219 A1* 9/2011 Shores et al. ............... 455/507

OTHER PUBLICATIONS

Jang, J, et al. "Transmit Power Adaptation for Multiuser OFDM Systems." IEEE Journal on Selected Areas in Communications, vol. 21, No. 2, pp. 171-178, Feb. 2003.

Jorswieck, E. A. et al. "Framework for Analysis of Opportunistic Schedulers: Average Sum Rate vs. Average Fairness." In Modeling and Optimization in Mobile, Ad Hoc, and Wireless Networks and Workshops, 2008. WiOPT 2008. 6th International Symposium on, Apr. 2008, pp. 100-105, Berlin, Germany.

Tejera, P. et al. "Subchannel Allocation in Multiuser Multiple-Input Multiple-Output Systems." Information Theory, IEEE Transactions on, vol. 52, No. 10, pp. 4721-4733, Oct. 2006.

Xu, W. et al. "Efficient Adaptive Resource Allocation for Multiuser OFDM Systems with Minimum Rate Constraints," in Communications, 2007. ICC '07. IEEE International Conference on, Jun. 2007, pp. 5126-5131, Glasgow, Scotland.

Yoo, T., et al. "Optimality of zero-forcing beamforming with multiuser diversity," in Proc. of the IEEE International Conference on Communications (ICC), vol. 1 May 2005, pp. 542-546.

Zhang, Y. J., et al. "Multiuser Adaptive Subcarrier-and-Bit Allocation with Adaptive Cell Selection for OFDM Systems." IEEE Transactions on Wireless Communications, vol. 3, No. 5, pp. 1566-1575, Sep. 2004.

* cited by examiner

RESOURCE ALLOCATION FOR MINIMUM SATISFACTION GUARANTEES IN MULTI-SERVICE AND MULTI-ANTENNA NETWORKS

RELATED APPLICATION

This application claims priority to U.S. Provisional Patent Application Ser. No. 61/726,201, filed 14 Nov. 2012 and titled "Resource Allocation for Minimum Satisfaction Guarantees in Multi-Service and Multi-Antenna Networks." The entire contents of the foregoing application are incorporated herein by reference.

TECHNICAL FIELD

This application is generally related to the management of time and frequency resources in wireless communication systems, and is more particularly related to resource management in multi-antenna networks.

BACKGROUND

In a wireless communication system, Radio Resource Allocation (RRA) algorithms are responsible for the management of the scarce resources available in the radio interface between a transmitter (such as a radio base station) and a receiver (such as a cellphone or other wireless terminal). In a multi-user and/or multi-service scenario, where one transmitter is transmitting user-specific data to each of several users and/or for each of several data services, these scarce resources, which include transmitter power, time slots, and frequency "chunks," must be divided among the users and/or services.

In multi-service scenarios, RRA algorithms can be used to satisfy Quality of Service (QoS) requirements for the connected flows, where a "flow" is the data (e.g., IP packets) corresponding to a particular user service, such as VoIP, web browsing, email, etc. (Other terms are "service data flow" and "data flow"—these terms may be considered to be interchangeable for the purposes of this document.) In general, the flows in a multi-service scenario have heterogeneous demands and different channel quality states.

However, RRA solutions that maximize spectral efficiency are not generally capable of fulfilling the QoS demands of the connected flows. (See E. A. Jorswieck, A. Sezgin, and X. Zhang, "Framework for Analysis of Opportunistic Schedulers: Average Sum Rate vs. Average Fairness," in Modeling and Optimization in Mobile, Ad Hoc, and Wireless Networks and Workshops, 2008. WiOPT 2008. 6th International Symposium on, Berlin, April 2008, pp. 100-105.) In the context of the problem of unconstrained data rate maximization in the context of Orthogonal Frequency Division Multiple Access (OFDMA) networks with single-antenna transceivers or Single-Input Single-Output (SISO), it has been shown that the optimum solution to the problem of frequency chunk allocation is obtained by a low-complexity algorithm with a simple idea: assign the resources to the flows with best channel quality on them. (J. Jang and K. B. Lee, "Transmit Power Adaptation for Multiuser OFDM Systems," IEEE Journal on Selected Areas in Communications, vol. 21, no. 2, pp. 171-178, February 2003.) Further research has been directed to the problem of frequency resource allocation for maximization of the total downlink data rate in the SISO scenario, subject to the constraint that all flows should have minimum data rate requirements fulfilled. Because the formulated problem is difficult to solve optimally, suboptimum solutions have been proposed. (Y. J. Zhang and K. B. Letaief, "Multiuser Adaptive Subcarrier-and-Bit Allocation with Adaptive Cell Selection for OFDM Systems," IEEE Transactions on Wireless Communications, vol. 3, no. 5, pp. 1566-1575, September 2004; P. Tejera, W. Utschick, G. Bauch, and J. A. Nossek, "Subchannel Allocation in Multiuser Multiple-Input Multiple-Output Systems," Information Theory, IEEE Transactions on, vol. 52, no. 10, pp. 4721-4733, October 2006.)

Making use of advanced signal processing algorithms, Multiple-Input Multiple-Output (MIMO) techniques represent a key technology to meet the requirements established by International Mobile Telecommunications (IMT)-Advanced, and feature prominently in the transmission techniques standardized by the $3^{rd}$-Generation Partnership Project (3GPP) for use in the so-called Long-Term Evolution (LTE) networks, which utilize OFDMA technology. However, MIMO technology presents new challenges for RRA, which has to cope with the introduction of the spatial dimension.

The use of multiple antennas at the transmitter and at the receiver allows for the simultaneous use of the same time-frequency resource by different flows, through the allocation of separate so-called Spatial Subchannels to the different flows. In the discussion that follows, the term "Space-Division Multiple Access (SDMA) group" refers to the set of flows that share a specific frequency resource.

The spatial dimension provided by MIMO systems can be exploited by RRA in order to improve the provided QoS for the flows. However, due to the additional complexity, the solution of the problem of unconstrained data rate maximization in the MIMO scenario employs computationally expensive, non-linear techniques that are not feasible for practical scenarios. (P. Tejera, W. Utschick, G. Bauch, and J. A. Nossek, "Subchannel Allocation in Multiuser Multiple-Input Multiple-Output Systems," Information Theory, IEEE Transactions on, vol. 52, no. 10, pp. 4721-4733, October 2006.)

Previous solutions to unconstrained data rate maximization in OFDMA networks do not take into account QoS issues that are of utmost concern in modern wireless networks. Other studies that do consider QoS guarantees have an important limitation. In particular, the resource assignment problem in these studies is based on an assumption that all flows are from the same service class and a requirement that all flows should have the QoS constraints fulfilled. RRA solutions applicable to a more flexible scenario where only a fraction of the multiservice flows should have the QoS requirements fulfilled are desired. These solutions should also take into account the introduction of the spatial dimension enabled by MIMO techniques. Finally, the provided solutions should be simple, in order to allow their use in practical scenarios.

SUMMARY

In general, operators can measure system performance by means of minimum user satisfaction constraints for each provided service type. More specifically, system operators may require that a certain fraction of the connected flows of each service be satisfied with the provided quality of service (QoS), e.g., data throughput. Given a particular number of connected flows for a given service, the minimum satisfaction constraint for that service thus specifies a particular number of flows that must be satisfied.

With this requirement in mind, a new RRA problem is addressed in the detailed disclosure that follows: the maximization of the overall data rate on a MIMO radio link, subject to instantaneous minimum satisfaction constraints per service. This RRA problem has not been previously considered in the literature on radio resource allocation. More specifically, the problem to be solved is to define the SDMA groups that should be multiplexed on each frequency chunk in order to maximize the total downlink data rate, while guaranteeing that a specified minimum number of flows from each service have their instantaneous QoS demands, e.g., data rates, fulfilled.

Embodiments of the disclosed techniques include methods and apparatus for dynamically allocating spatial and time-frequency resources among a plurality of data flows corresponding to a plurality of mobile terminals and a plurality of data services, each data service having a minimum satisfaction constraint that specifies a minimum number of flows of the data service that must be satisfied by the allocation of resources. The disclosed methods are suitable for implementation in a scheduling node of a wireless communication network, for example, such as in an eNodeB in an LTE network.

An example method according to some embodiments of the invention begins with performing an initial allocation of available spatial and time-frequency resources to the data flows, based on channel state information for the mobile terminals, so as to define from the data flows, a spatial-multiplexing group for each of a plurality of available time-frequency resource blocks, while ensuring that at least one of the data flows is satisfied by the allocating of resources. In some embodiments, this initial allocation is a maximum-rate allocation that defines a spatial-multiplexing group that leads to the highest possible data rate for each time-frequency resource block. The method continues with the identification of a receiver flow set, a donor flow set, and an available resource set, from the data flows in the initial allocation. The receiver flow set comprises data flows that have not been allocated sufficient resources to be satisfied, the donor flow set comprises data flows that have been allocated at least sufficient resources to be satisfied, and the available resource set comprises all resources assigned to the data flows in the donor flow set in the initial allocation.

Next, a data flow having the worst channel conditions is selected from the receiver flow set. A time-frequency resource block selected from the available resource set is reallocated to a spatial-multiplexing group that includes the selected data flow, based on a reallocation metric that accounts for (a) a reduction in the distance between flow data rates achievable by the most current allocation of resources and data rate requirements for data flows in the receiver flow set, and (b) a loss in total throughput caused by the reallocation of the identified time-frequency resource block. An example of one such metric is described in the detailed description below.

Data rates of data flows in the receiver and donor flow sets are updated, based on the reallocation, and the selected data flow and other flows from the receiver flow set are removed from the receiver flow set if they are satisfied after the reallocation. The reallocated time-frequency resource block is also removed from the available resource set. Then, the selecting, reallocating, updating, and removing operations are repeated, until there are no data flows in the receiver flow set or until no time-frequency resource blocks can be reallocated without causing a data flow in the donor flow set to become unsatisfied. The former case indicates that the reallocation was successful in meeting all of the minimum satisfaction constrains, while the latter case indicates that a feasible solution is not possible.

In some embodiments, the initial allocation operation described above comprises an unconstrained maximization procedure that begins with the identification of an auxiliary flow set and an available flow set, the auxiliary and available flow sets each initially comprising all of the data flows. Data flows for any data service that requires one-hundred percent of the data flows for that data services to be satisfied are removed from the auxiliary flow set, and an initial maximum-rate allocation of spatial and time-frequency resources to data flows from the available flow set is performed. After determining that the minimum satisfaction constraint is not met, a data flow that requires a highest average number of spatial and time-frequency resources to be satisfied, in view of all possible spatial-multiplexing groups, is selected from the auxiliary flow set. This identified data flow is then removed from the from the auxiliary flow set and the available flow set, along with all other data flows for the data service of the identified data flow from the auxiliary flow set if no further data flows for that data service can be removed from the available flow set without making it impossible for the minimum satisfaction constraint to be met by allocating resources to only data flows in the available flow set.

Spatial and time-frequency resources are allocated once again to data flows remaining in the available flow set, according to a maximum-rate allocation. After it is determined that the auxiliary flow set is not empty, the selecting, removing, allocating, and determining operations are repeated until the auxiliary flow set is empty. Once the auxiliary flow set is empty, the donor, receiver, and available resource sets can then be initialized in preparation for the reallocation portion of the radio resource allocation procedure.

Corresponding scheduling node apparatus adapted to carry out one or more of the methods summarized above are also described in detail below. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface (radio link) are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
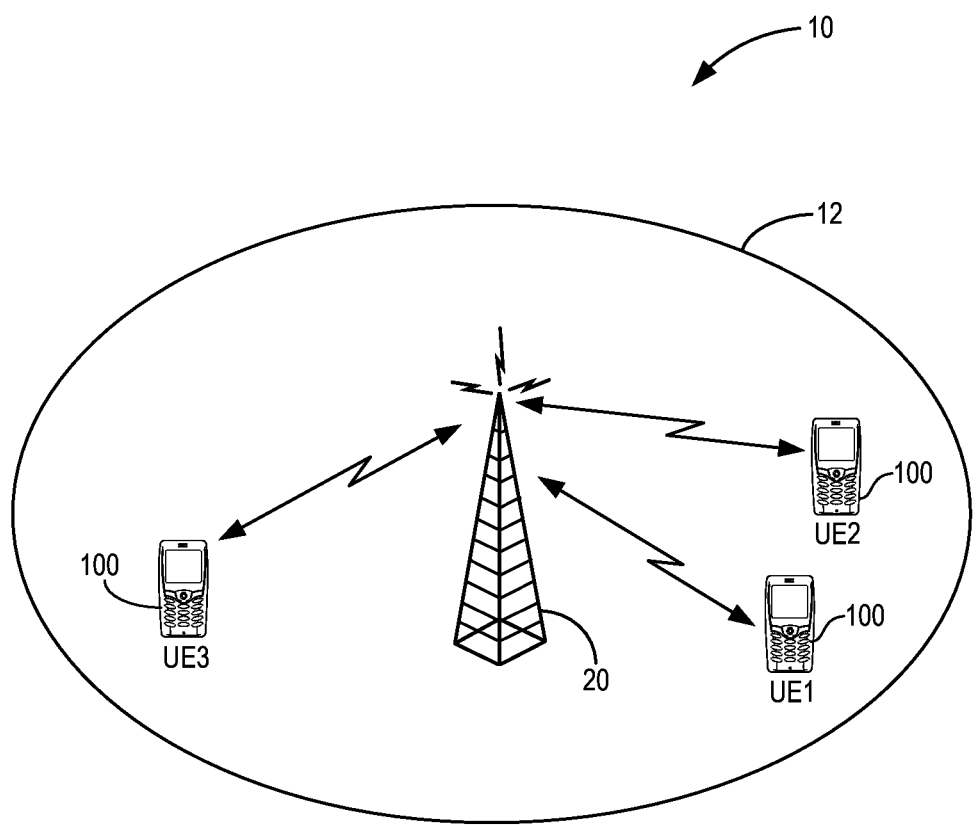
FIG. 1 illustrates a portion of an example wireless communication network.

Referring now to the drawings, FIG. 1 illustrates an exemplary mobile communication network 10 for providing wireless communication services to mobile stations 100. Three mobile stations 100, which are referred to as "user equipment" or "UE" in LTE terminology, are shown in FIG. 1. The mobile stations 100 may comprise, for example, cellular telephones, personal digital assistants, smart phones, laptop computers, handheld computers, or other devices with wireless communication capabilities. It should be noted that the terms "mobile station" or "mobile terminal," as used herein, refer to a terminal operating in a mobile communication network and does not necessarily imply that the terminal itself is mobile or moveable. Thus, the term may refer to terminals that are installed in fixed configurations, such as in certain machine-to-machine applications, as well as to portable devices, devices installed in motor vehicles, etc.

Mobile communication network 10 comprises a plurality of geographic cell areas or sectors 12, only one of which is illustrated in FIG. 1. Each geographic cell area or sector 12 is served by a base station 20, which is referred to in LTE as a NodeB or Evolved NodeB (eNodeB). One base station 20 may provide service in multiple geographic cell areas or sectors 12. The mobile stations 100 receive signals from base station 20 on one or more downlink (DL) channels, and transmit signals to the base station 20 on one or more uplink (UL) channels. The eNodeB is responsible for scheduling uplink and downlink transmissions to and from the mobile terminals and, in some embodiments of the present invention, is configured to carry out one or more of the RRA techniques described in detail below.

For illustrative purposes, then, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems.

As discussed above, the use of multiple antennas at transmitter and receiver allows for the simultaneous use of the same frequency chunk by different flows for data transmission. In MIMO systems, the spatial dimension can be exploited by RRA in order to improve the QoS, such as the data throughput, provided to the flows. The introduction of the spatial dimension enabled by MIMO techniques should therefore be taken into account in the RRA for modern wireless systems. The provided solutions should be simple, in order to allow their use in practical scenarios.

Operators of wireless communication systems can control system performance by means of minimum user satisfaction constraints for each provided service type. More specifically, system operators may require that a certain fraction of the connected flows of each service be satisfied with the provided QoS. Given a particular number of connected flows for a given service, the minimum satisfaction constraint for that service thus specifies a particular number of flows that must be satisfied.

The techniques described herein address a new RRA problem: the maximization of the overall data rate on a MIMO radio link, subject to instantaneous minimum satisfaction constraints per service. More specifically, the problem to be solved is to define the SDMA groups that should be multiplexed on each frequency chunk in order to maximize the total downlink data rate, while guaranteeing that a specified minimum number of flows from each service have their instantaneous QoS demands fulfilled.

It should be appreciated that a particular terminal or User Equipment (UE) can bear multiple service flows simultaneously. To simplify the explanation of the present invention, only one service flow is considered per UE in much of the discussion that follows. Consequently, "flow" and "UE" are interchangeable throughout much of the text that follows. It should be understood, however, that the techniques described herein are equally applicable to scenarios in which one or more of the served UEs are bearing multiple flows. In such a scenario, the multiple flows corresponding to a single UE will experience the same channel conditions, while flows directed to different UEs will generally experience different channel conditions.

Figure 2:
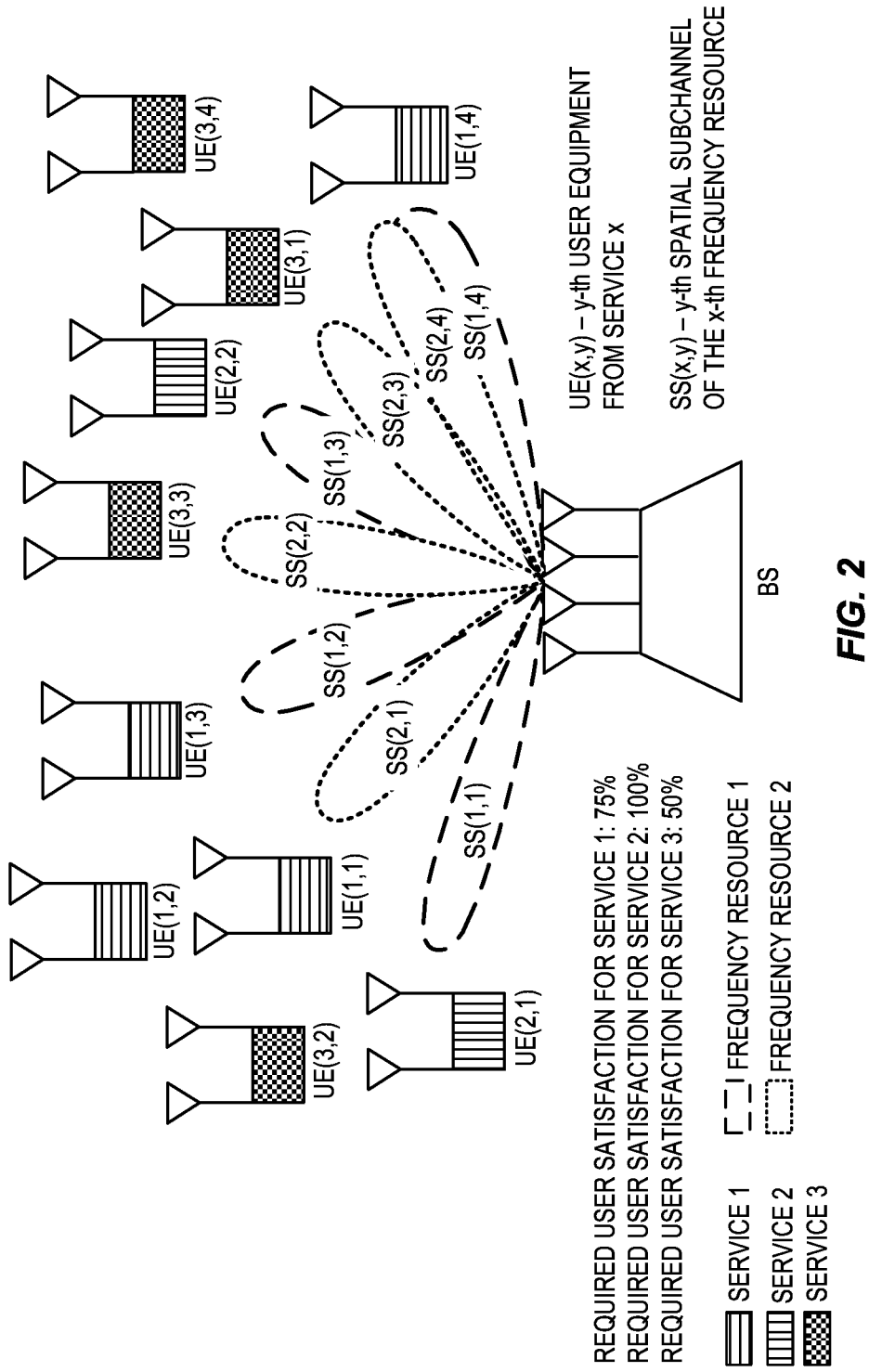
FIG. 2 is a system diagram illustrating an example scenario for the application of Radio Resource Allocation to maximize total data rate with minimum satisfaction constraints in a multi-service, multi-resource, and multi-antenna system.

FIG. 2 illustrates a simple example of the problem addressed by embodiments of the present invention. In the illustrated scenario, ten UEs, corresponding to ten flows, are equipped with two antennas each, while the serving base station (BS) has four antennas. To keep the example simple, it is assumed that there are only two orthogonal time-frequency resources. Note that a "resource" in the present discussion refers to the smallest allocable "chunk" of time-frequency and/or spatial resource. In an LTE system, for example, an allocable resource might be a Resource Block or a Resource Block pair. Thus, a real system could have many orthogonal time-frequency resources that can be separately allocated.

It should be further noted that the term "frequency resource," rather than "time-frequency resource," is used in much of the discussion that follows. For the purposes of explaining the essential features of the invention, these terms should be regarded as interchangeable, since any allocation of frequency resources for a given resource allocation interval is necessarily an allocation of time-frequency resources. It will be appreciated that in an OFDMA system in particular, there is potentially a great deal of flexibility in how the time-frequency grid is subdivided and allocated.

Each UE in the scenario illustrated in FIG. 2 is associated with a specific data flow from one of the services provided in the system, e.g., Voice over Internet Protocol (VoIP), web browsing, video streaming, etc. In this example, three services are provided. Service 1 and Service 3 each have 4 connected flows, while Service 2 has 2 connected flows. For each service the system operator has defined specific minimum user satisfaction requirements. These requirements can be instantaneously mapped to the number of flows for a given service that should get assigned system resources in order to fulfill their QoS demands. In the illustrated example, the resource allocation should be performed to satisfy 75% of the flows from service 1 (i.e., 3 of 4 flows), 100% of the flows from service 2 (i.e., 2 of 2 flows), and finally 50% of the flows from service 3 (i.e., 2 of 4 flows).

Due to the use of multiple antennas, the BS in this example can multiplex up to four flows at the same time on a single time-frequency resource, by the allocation of different spatial sub-channels (SSs). In this example, a first SDMA group, consisting of those UEs/flows multiplexed on the first frequency resource, include the UEs 3 and 4 with flows from service 1, designated UE(1,3) and UE(1, 4), and the UEs 1 and 2 with flows from service 2, designated UE(2,1) and UE(2,2). Thus, the base station re-uses the first frequency resource four times to service these flows, as represented by the "beams" emanating from the BS and labeled SS(1,1) SS(1,2), SS(1,3), and SS(1,4). Similarly, a second SDMA group, multiplexed on the second frequency resource, consists of the UEs 1 and 4 with flows from service 1, designated UE(1,1) and UE(1,4), and the UEs 1 and 3 with flows from service 3, designated UE(3,1) and UE(3,3). Again, the second frequency resource is re-used four times to service these flows, as represented by the beams labeled SS(2,1), SS(2,2), SS(2,3), and SS(2,4). Note that in the illustrated scenario, three flows, UE(1,2), UE(3,2) and UE(3,4), are not serviced in the current resource allocation interval.

The scenario shown in FIG. 2 illustrates a potential resource allocation that meets the given minimum satisfaction constraints for three data services. Three of the four UEs corresponding to service 1 are allocated resources, satisfying the 75% minimum constraint for service 1. Both of the two UEs corresponding to service 2 are allocated resources, satisfying the 100% minimum constraint for service 2. Finally, two of the four UEs corresponding to service 3 are allocated resources, exactly satisfying the 50% minimum constraint for that service.

The problem addressed by several embodiments of the present invention is how to maximize the total data rate provided by the base station while meeting the minimum satisfaction constraints for each resource allocation interval. The techniques described below provide a low complexity solution (from a computation standpoint) to this problem.

The implementation of these techniques may be considered in two parts, which are referred to below as "Unconstrained Maximization" operation and a "Reallocation" operation. In the Unconstrained Maximization part, the general idea is to have a good initial assignment that is on the boundary of the sum-rate capacity region. In the Reallocation part, time-frequency resources, e.g., Resource Blocks (RBs), are switched between SDMA groups in order to satisfy the required number of flows for each service. This is equivalent to adding or taking out flows from each of one or more SDMA groups defined in the Unconstrained Maximization part.

Figure 3:
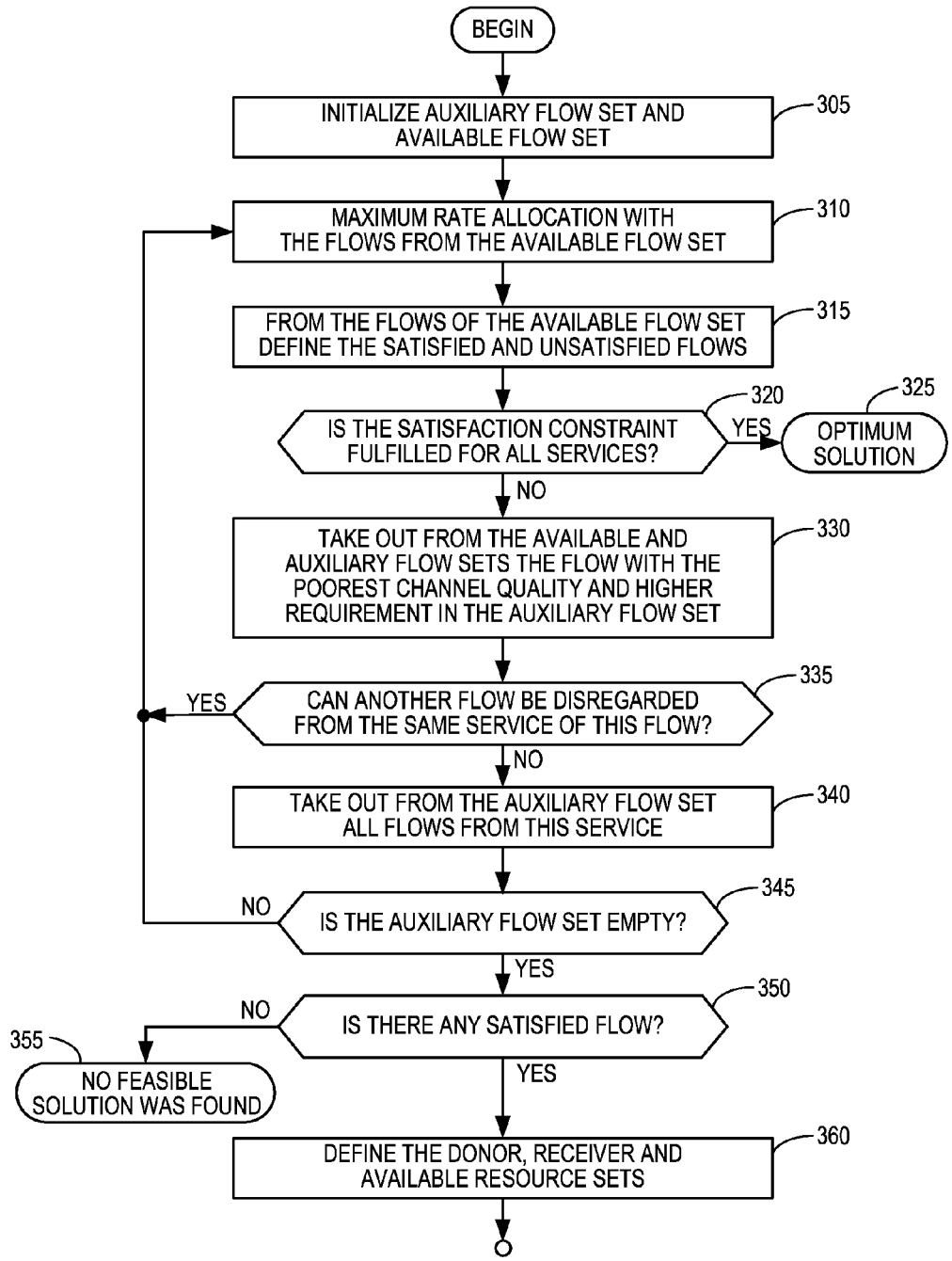
FIG. 3 is a flowchart illustrating an example of the "Unconstrained Maximization" portion of the Radio Resource Allocation (RRA) technique, according to some embodiments of the invention.
Figure 4:
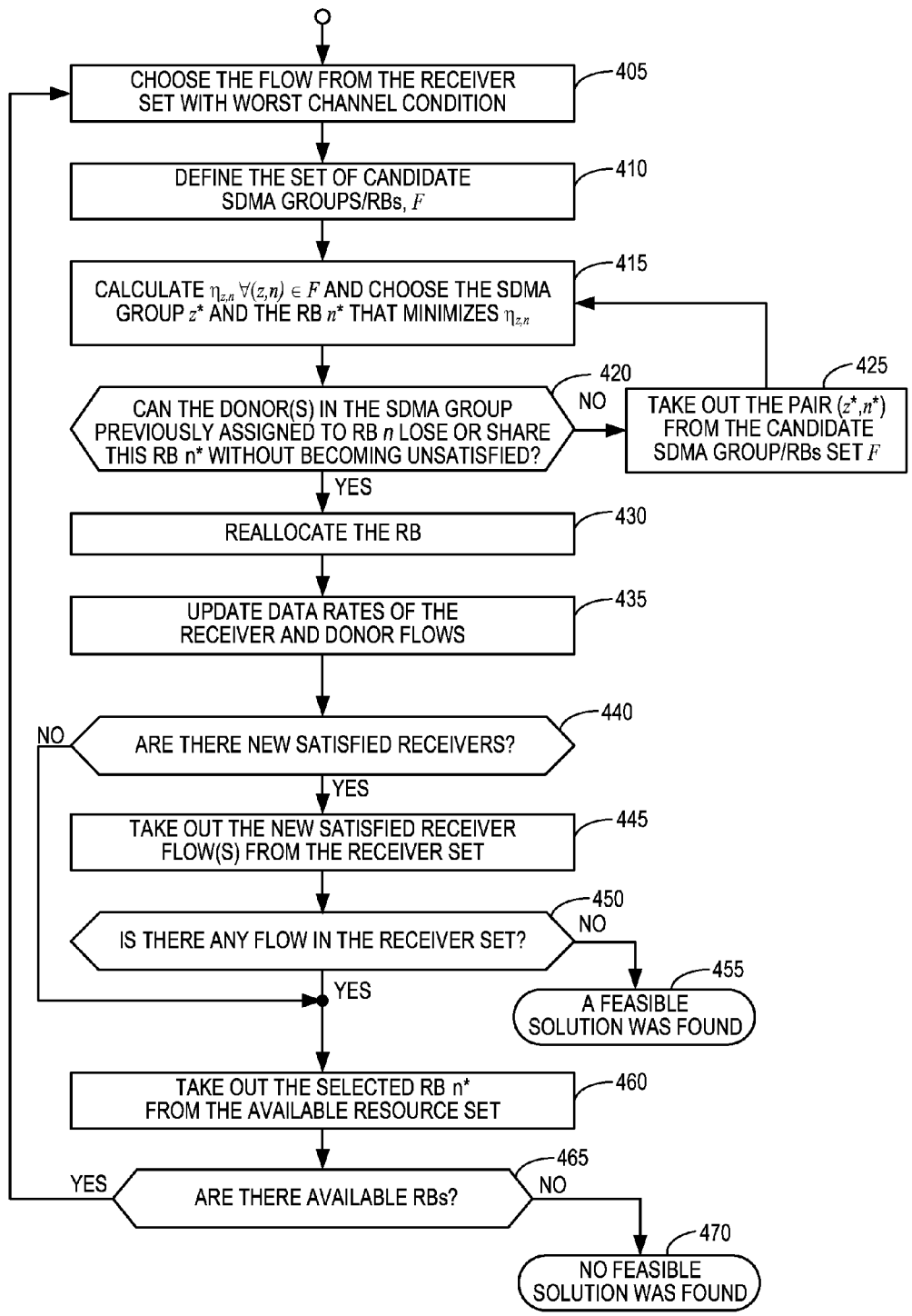
FIG. 4 is a flowchart illustrating an example of the "Reallocation" portion of the RRA technique, according to some embodiments of the invention.

FIGS. 3 and 4 are flowcharts illustrating example embodiments of the Unconstrained Maximization and Reallocation parts of the proposed invention, respectively.

Part 1: Unconstrained Maximization

In this part, RBs are assigned to SDMA groups in an opportunistic way, such that the RBs that provide the highest data rate will be allocated to the SDMA group.

The illustrated technique begins with initialization operations. First, as shown at block 305, an auxiliary ($\mathcal{B}$) flow set and an available ($\mathcal{A}$) flow set are defined, and each is initialized to equal the set of all flows ($\mathcal{J}$). As will be seen below, the auxiliary ($\mathcal{B}$) flow set tracks the flows that may later be disregarded. Of course, a flow for a particular service cannot be disregarded if the number of flows disregarded for that service makes it impossible to meet the minimum satisfaction for that service. Thus, before disregarding a flow for the first time, the flows for any service that requires that 100% of the flows be satisfied should be removed from the auxiliary flow set $\mathcal{B}$. This can be done as part of the initialization operation illustrated at block 305.

Then, as shown at block 310, the problem of maximum rate allocation is solved with the flows from the available flow set $\mathcal{A}$, given the channel conditions between the base station and each of the serviced UEs. This may be done using known techniques for maximum rate allocation. Thus, we assume that SDMA groups are built based on prior methods and that a given spatial filtering strategy, such as linear Zero Forcing (ZF) or Minimum Mean Square Error (MMSE) precoding, is used in order to spatially multiplex the UEs in each SDMA group.

One example of such a spatial filtering strategy is described in T. Yoo and A. Goldsmith, "Optimality of zero-forcing beamforming with multiuser diversity," in Proc. of the IEEE Internat. Conf. on Commun. (ICC), vol. 1, May. 2005, pp. 542-546. Depending on the used spatial filtering and channel state, each flow in an SDMA group that was assigned to a given RB obtains a specific SINR (Signal to Interference plus Noise Ratio). Adaptive modulation and coding (or link adaptation) can be used to improve the achieved SINR of a flow. Higher achieved SINR for a flow in an SDMA group and RB increases the possible transmit data rate of this flow.

For instance, consider an example with three flows (numbered 1, 2, and 3) and two resources, RB 1 and RB 2. The possible SDMA groups in this case are: {1}, {2}, {3}, {1, 2}, {1,3}, {2, 3}, {1, 2, 3}. Consider that after applying a specific spatial filtering strategy the following possible transmit data rates in kbps are achieved on each RB:

TABLE 1

Possible transmit data rates for RB 1

| SDMA group | Data rate flow 1 | Data rate flow 2 | Data rate flow 3 | Total data rate |
|---|---|---|---|---|
| {1} | 300 | 0 | 0 | 300 |
| {2} | 0 | 350 | 0 | 350 |
| {2} | 0 | 0 | 50 | 50 |
| {1, 2} | 200 | 250 | 0 | 450 |
| {1, 3} | 150 | 0 | 30 | 180 |
| {2, 3} | 0 | 230 | 40 | 270 |
| {1, 2, 3} | 100 | 80 | 30 | 210 |

TABLE 2

Possible transmit data rates for RB 2

| SDMA group | Data rate flow 1 | Data rate flow 2 | Data rate flow 3 | Total data rate |
|---|---|---|---|---|
| {1} | 180 | 0 | 0 | 180 |
| {2} | 0 | 200 | 0 | 200 |
| {2} | 0 | 0 | 380 | 380 |
| {1, 2} | 110 | 110 | 0 | 220 |
| {1, 3} | 50 | 0 | 200 | 250 |
| {2, 3} | 0 | 150 | 280 | 430 |
| {1, 2, 3} | 30 | 80 | 100 | 210 |

Note that the values in the table are only for illustration. The maximum rate allocation operation discussed above (and illustrated at block 310 of FIG. 3) would choose the SDMA group that provides the greatest total data rate on each RB. Given these tables, for RB 1 the chosen SDMA group is {1, 2}, which provides a total transmit data rate of 450 kbps. For RB 2, the selected SDMA group is {2,3} since it provides a total data rate of 430 kbps. Note that in this example, all three flows are provided with some resources, capable of providing data rates of 200 kbps, 400 kbps, and 280 kbps for flows 1, 2, and 3, respectively. This doesn't mean that the data flow requirements for all three flows are necessarily met. Further, it will not always be the case that maximum rate allocation results in the assignment of at least some resources to each flow.

The data rates of each UE on each SDMA group used in the Unconstrained Maximization portion of the procedure can be determined based on existing methods, e.g., based on channel state information readily available in the system. The problem of rate maximization in this case is similar to the SISO case, with the difference that in this case the SDMA group that leads to the highest data rate on each RB is determined, instead of searching for the best UE, as in the SISO case. Notice that, in a more general sense, the Unconstrained Maximization can be performed based on any model that allows the mapping of channel state information to rate estimates.

The next phase of the Unconstrained Maximization portion of the procedure, illustrated at blocks 315 to 340, is a constraints check phase. After the initialization, the flows that have their data rate requirements fulfilled are defined as satisfied flows, and the remaining ones as unsatisfied flows. If the minimum required number of satisfied flows of each service is achieved, then the system has found an optimum solution, as shown at blocks 320 and 325. However, note that this is an uncommon situation, particularly in a first iteration, due to the distribution of the UEs within the cell. In general, a relatively few UEs will get most of the available RBs.

In the more likely event that the satisfaction constraint for at least one service is not fulfilled, as indicated by the arrow labeled "NO" and exiting block 320, a flow of the auxiliary flow set $\mathcal{B}$ will be disregarded. By disregarding a flow we mean that it will not receive resources at the current transmission-time interval (i.e., resource allocation interval).

Assuming that any of the flows in the auxiliary flow set $\mathcal{B}$ can potentially be disregarded, one criterion that can be used to select the flow j* to be disregarded is given by $$j^* = \underset{j \in \mathcal{B}}{\operatorname{argmin}} \frac{\left(\frac{1}{G \cdot N} \sum_{z=G} \sum_{n \in \mathcal{N}} r_{z,n,j}\right)}{t_j} \quad (1)$$

where G is the number of possible SDMA groups, N is the number of RBs available in the system, the set $\mathcal{B}$ contains the flows of the services that still can be disregarded, and $r_{z,n,j}$ means the transmit data rate of flow j when the RB n is allocated to the SDMA group z. Note that if flow j does not belong to SDMA group z, then the transmit data rate $r_{z,n,j}$ is equal to zero. The required data rate of flow j is represented by the variable $t_j$, and $\mathcal{G}$ and $\mathcal{N}$ are the sets with the indices of all SDMA groups and RBs, respectively.

One possible criterion for disregarding a flow is quite reasonable: we disregard the flow that requires, on average, more RBs to be satisfied. Disregarding this flow in a subsequent maximum-rate allocation operation potentially makes it easier to satisfy more flows. The selected flow is thus taken out of the available and auxiliary flow sets, i.e., from $\mathcal{A}$ and $\mathcal{B}$, respectively, as shown at block 330.

The next step, as shown at block 335, is to check whether the service of the disregarded flow can have another flow disregarded without infringing the minimum satisfaction constraint of the considered service. If this is possible, the maximum rate allocation operation shown in block 310 is repeated, with the remaining flows in the available flow set. If this is not possible, all the flows from this service are taken out of the auxiliary flow set $\mathcal{B}$, as shown at block 340. In this case, no flow from that service will be disregarded anymore. After that, the maximum rate allocation is repeated with the remaining flows in the available flow set, as shown at block 310. The operations in steps 310-340 of FIG. 3 are repeated until either a feasible solution is found (as shown at blocks 320 and 325) or until no flow can be disregarded, i.e., the auxiliary flow set $\mathcal{B}$ is empty, as indicated at block 345.

The final phase of the of the Unconstrained Maximization portion of the procedure is a reallocation preparation phase, illustrated in blocks 345-360 of FIG. 3. In the event that the auxiliary flow set is empty, as indicated by the "YES" arrow exiting block 345 in FIG. 3, the system checks to determine whether at least one flow is satisfied, as shown at block 350. If not, then no feasible solution can be found for the current resource allocation interval, as indicated at block 355, and the scheduling mechanism cannot satisfy the minimum satisfaction constraint for the current interval. In such cases, the minimum satisfaction constraints could be relaxed. For example, the system might be configured to disregard the flows of the services with lower priority (best effort services), and to then try to find a satisfied flow after running the Unconstrained Maximization operations again.

As shown at block 360, however, if at least one flow is satisfied then three new sets are defined from the available flow set $\mathcal{A}$ and the RB set $\mathcal{N}$: a donor flow set $\mathcal{D}$, a receiver flow set $\mathcal{R}$, and an available resource set $\mathcal{P}$. The donor flow set $\mathcal{D}$ is composed of the satisfied flows in the available flow set $\mathcal{A}$ that can donate/share RBs to/with the unsatisfied flows. The receiver flow set $\mathcal{R}$ is composed of the unsatisfied flows from the available flow set $\mathcal{A}$, which need to receive RBs from the donors to have their rate requirements fulfilled. Finally, the available resource set $\mathcal{P}$ is composed of all the resources currently allocated exclusively to the flows in the donor flow set, i.e., the resources that are available to be donated/shared to/with the unsatisfied flows (receiver flows).

Part 2: Reallocation

In the Reallocation part of the RRA described herein, time-frequency resources, e.g., Resource Blocks (RBs), are switched between SDMA groups in order to satisfy the required number of flows for each service. This is equivalent to adding or taking out flows from each of one or more SDMA groups defined in the Unconstrained Maximization part. FIG.

4 is a process flow diagram illustrating an example method for carrying out the Reallocation part.

Reallocation Initialization (Steps 1 and 2 in FIG. 4)

The Reallocation process begins with a reallocation initialization phase, illustrated as blocks 405 and 410 in FIG. 4. As shown at block 405, the process begins with a selection, from the receiver flow set ($\mathcal{R}$), of the flow that has the worst channel quality. The selected flow will get additional resources until its data rate requirement is fulfilled. The main motivation for this procedure is to assign the minimum number of RBs necessary to satisfy the flows with bad channel conditions, while assigning the remaining RBs to the flows having better channel quality, which might be easier to satisfy. Notice that channel quality estimates can be obtained with existing mechanisms and made available to the proposed method.

After that, the procedure continues with an identification of the pairs (z, n), composed of an SDMA group (z) and an RB (n), that are candidates to be chosen in the reallocation procedure, as shown at block 410. These candidate SDMA groups include all of the SDMA groups that are composed of the selected flow and flows in the receiver and donor flow sets. The RBs available for reallocation are the ones in the available resource set, i.e., all RBs assigned exclusively to donor flows, as well as the RBs currently assigned to SDMA groups that contain the selected flow and that do not contain other receiver flow.

The next phase in the Reallocation procedure is the calculation of a reallocation compatibility metric, as shown at block 415 of FIG. 4. First, it is considered that the candidate SDMA groups/RBs pairs (z, n) are disposed in the Candidate SDMA group/RBs set $\mathcal{F}$. To find the best RB and the SDMA group for reallocation, a reallocation metric needs to be defined. The reasoning underlying the definition of the reallocation metric is that an RB should be reallocated to an SDMA group in such a way that best reduces the distance between the current data rates and requirements of the flows in the receiver flow set, while not causing a high sum rate loss. This criterion can be achieved by the following metric:

$$\frac{\sum_{j \in R} |t_j - (R_j^{curr} + r_{z,n,j} - r_{z',n,j})|}{\sum_{j \in r} |t_j - R_j^{curr}|} \cdot \frac{\varphi^{curr}}{\varphi_{z,n}^{new}}, \quad (2)$$

where $R_j^{curr}$ is the data rate of flow j according to the current resource assignment, $\phi^{curr}$ is the sum rate (the total data rate provided to all flows) according to the current resource assignment, and $\phi_{z,n}^{new}$ is the sum rate when the SDMA group z is chosen to receive the RB n, without modifying the assignment of other RBs. The variable $r_{z',n,j}$ represents the transmit data rate of flow j when the SDMA group z' is allocated to RB n. The SDMA group z' consists of the current SDMA group allocated to RB n, i.e., before reallocation. Note that $\phi_{z,n}^{new} \leq \phi^{curr}$, since the process begins with the maximum rate solution identified in the Unconstrained Maximization portion of the RRA procedure. The pair of SDMA group and RB chosen in the reallocation process is the one that minimizes the metric $\eta_{z,n}$, i.e., $$(z^*, n^*) = \arg\min_{\forall (z,n) \in F} \eta_{z,n}, \quad (3)$$

where the chosen pair is the SDMA group z* and RB n*.

Of course, the general criterion described above can be formulated in several different ways; the formulas provided in equations (2) and (3) should be considered as non-limiting examples. Furthermore, as suggested previously, the estimates of the data rates used in this step can be determined based on the knowledge of the composition of SDMA groups, and the employed spatial filtering strategies, and of channel state information, using any known rate estimation method.

The next step in the Reallocation part of the RRA procedure is a constraints check phase, illustrated in FIG. 4 at blocks 420-445. The constraints check phase begins with a determination of whether the reallocation identified with the reallocation compatibility metric would cause any donor flow that is part of the SDMA group in the chosen RB to become unsatisfied. This is shown at block 420 of FIG. 4. If the reallocation would cause a donor flow to become unsatisfied, as indicated by the "NO" arrow exiting block 420 in FIG. 4, the reallocation is not performed and the chosen pair SDMA group/RB is not available for reallocation anymore, as shown at block 425. In this case, the procedure repeats the calculation of the reallocation compatibility metric (block 415) and repeats the constraints check (block 420).

If the reallocation does not cause a donor flow to become unsatisfied, on the other hand, as indicated by the "YES" arrow exiting 420, the reallocation is performed and the receiver and donor flows data rates are updated, as shown at blocks 430 and 435. Next, the system checks whether any receiver flow has become satisfied after reallocation, as shown at block 440, after updating the data rates of the receiver and donor flow. If so, these flows are taken out of the receiver flow set, as shown at block 445.

The algorithm ends with a feasible solution when there is no flow in the receiver flow set, i.e., all receiver flows have become satisfied in the reallocation process. This is shown at blocks 450 and 455, in FIG. 4. Otherwise, after taking out the reallocated resource from the available resource set, as shown at block 460, if there are remaining unsatisfied flows in the receiver flow set and there are additional resources available for allocation, then the entire reallocation part of the procedure is repeated, as indicated by block 465 and the "YES" path leading from block 465 to block 405.

On the other hand, an outage event occurs when flows in the receiver flow set still exist but there is no RB for reallocation. This is shown at block 470 of FIG. 4, which is reached via the "NO" path leading from block 465. One alternative in this case is to disregard the flows of low priority services and to re-run the procedures shown in FIGS. 3 and 4 again, from the beginning. Alternatively, in the event of outage, the system can fall back to the results of the Unconstrained Maximization operation, or to any other existing solution.

Figure 5:
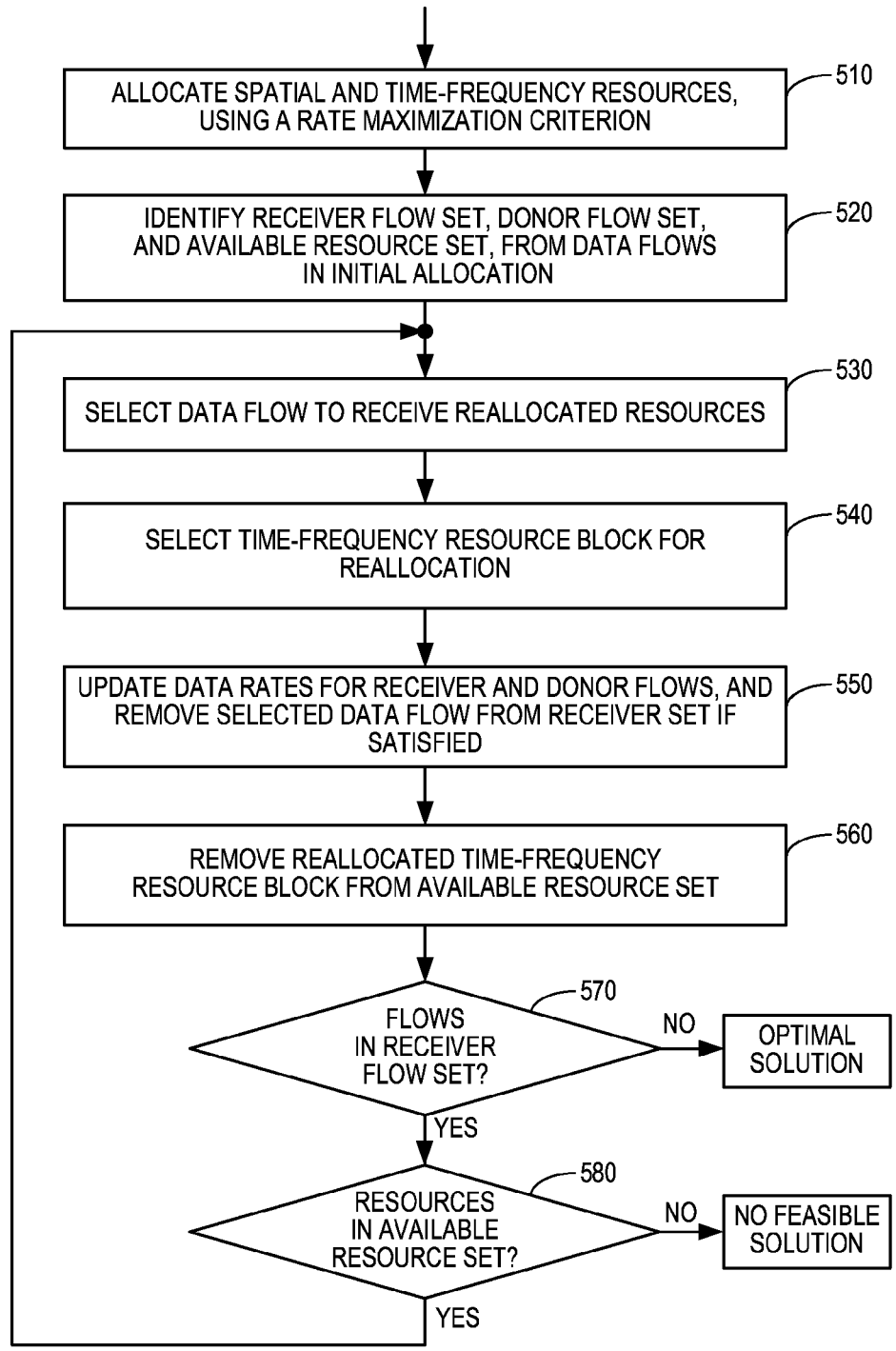
FIG. 5 is a process flow diagram illustrating a generalized procedure for dynamically allocating spatial and time-frequency resources among a plurality of data flows corresponding to a plurality of mobile terminals and a plurality of data services, according to some embodiments of the invention.

It should be appreciated that FIGS. 3 and 4 illustrate a particular embodiment of the RRA techniques contemplated by the present disclosure. FIG. 5, on the other hand, is a process flow diagram illustrating a generalized method for dynamically allocating spatial and time-frequency resources among a plurality of data flows corresponding to a plurality of mobile terminals and a plurality of data services, each data service having a minimum satisfaction constraint that specifies a minimum number of flows of the data service that must be satisfied by the allocating of resources. The illustrated method is suitable for implementation in a scheduling node of a wireless communication network, for example, such as in an eNodeB in an LTE network. Accordingly, it will be appreciated that the processes illustrated in FIGS. 3 and 4 represent one example of the more generalized procedure shown in FIG. 5. More particularly, the initial allocation operation shown in block 510 of FIG. 5 and the identification of a receiver flow set, donor flow set and available resource set shown in block 520 of FIG. 5 correspond to the flow diagram of FIG. 3, while the remaining operations of FIG. 5 correspond generally to the flow diagram of FIG. 4.

As shown at block 510, the illustrated method begins with performing an initial allocation of available spatial and time-frequency resources to the data flows, based on channel state information for the mobile terminals, so as to define from the data flows, a spatial-multiplexing group for each of a plurality of available time-frequency resource blocks, while ensuring that at least one of the data flows is satisfied by the allocating of resources. In some embodiments, this initial allocation is a maximum-rate allocation that defines a spatial-multiplexing group that leads to the highest possible data rate for each time-frequency resource block. Details of one approach to this initial allocation operation were shown in blocks 305-345 of FIG. 3 and discussed above.

Referring to FIG. 5 once again, the illustrated method continues, as shown at block 520, with the identification of a receiver flow set, a donor flow set, and an available resource set, from the data flows in the initial allocation. The receiver flow set comprises data flows that have not been allocated sufficient resources to be satisfied, the donor flow set comprises data flows that have been allocated at least enough resources to be satisfied, and the available resource set comprises all resources assigned exclusively to the data flows in the donor flow set in the initial allocation.

As shown at block 530, a data flow having the worst channel conditions is selected from the receiver flow set. Next, as shown at block 540, a time-frequency resource block selected from the available resource set is reallocated to a spatial-multiplexing group that includes the selected data flow, based on a reallocation metric that accounts for (a) a reduction in the distance between flow data rates achievable by the most current allocation of resources and data rate requirements for data flows in the receiver flow set, and (b) a loss in total throughput caused by the reallocation of the identified time-frequency resource block. An example of such a reallocation metric was given earlier, in equations (2) and (3).

As shown at block 550, data rates of data flows in the receiver and donor flow sets are updated, and the selected data flow and other flows from the receiver flow set are removed from the receiver flow set if they are satisfied after the reallocation. The reallocated time-frequency resource block is also removed from the available resource set, as shown at block 560. Then, the selecting, reallocating, updating, and removing operations are repeated, until there are no data flows in the receiver flow set or until no time-frequency resource blocks can be reallocated without causing a data flow in the donor flow set to become unsatisfied, as determined at blocks 570 and 580. The former case indicates that the reallocation was successful in meeting all of the minimum satisfaction constrains, while the latter case indicates that a feasible solution is not possible.

Figure 6:
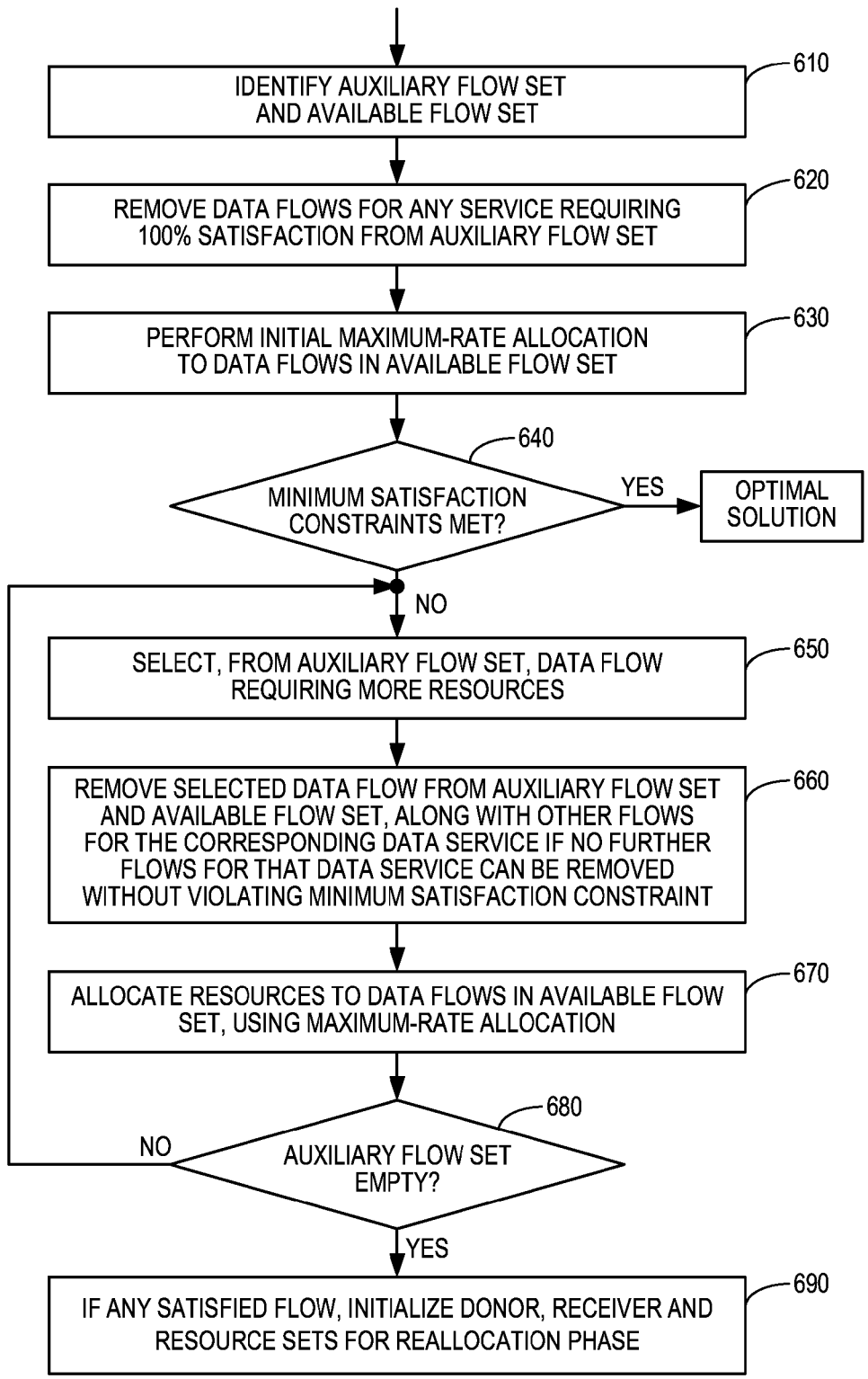
FIG. 6 is a process flow diagram illustrating details of an initial allocation procedure according to some embodiments of the present invention.

As noted above, the initial allocation operation illustrated in block 510 of FIG. 5 corresponds, in some embodiments, to the Unconstrained Maximization procedure illustrated in FIG. 3 and discussed in detail above. FIG. 6 is a process flow diagram illustrating a somewhat more generalized procedure for carrying out the initial allocation operation.

The process illustrated in FIG. 6 begins, as shown at block 610, with the identification of an auxiliary flow set and an available flow set, the auxiliary flow set and the available each initially comprising all of the data flows. Next, as shown at block 620, data flows for any data service that requires one-hundred percent of the data flows for that data services to be satisfied are removed from the auxiliary flow set.

A first maximum-rate allocation of spatial and time-frequency resources to data flows from the available flow set is performed, as shown at block 630. After determining that the minimum satisfaction constraint is not met, as shown at block 640, a data flow that requires more spatial and time-frequency resources to be satisfied than others, in view of all possible spatial-multiplexing groups, is selected from the auxiliary flow set, as shown at block 650. More particularly, in some embodiments, the data flow that requires a highest average number of spatial and time-frequency resources to be satisfied, in view of all possible spatial-multiplexing groups, is selected. This identified data flow is then removed from the from the auxiliary flow set and the available flow set, as shown at block 660, along with all other data flows for the data service of the identified data flow from the auxiliary flow set if no further data flows for that data service can be removed from the available flow set without making it impossible for the minimum satisfaction constraint to be met by allocating resources to only data flows in the available flow set.

Next, as shown at block 670, spatial and time-frequency resources are allocated once again to data flows remaining in the available flow set, according to a maximum-rate allocation. After it is determined that the auxiliary flow set is not empty, as shown at block 680, the selecting, removing, allocating, and determining operations shown in blocks 650, 660, 670, and 680 are repeated until the auxiliary flow set is empty. Once the auxiliary flow set is empty, the donor, receiver, and available resource sets can then be initialized in preparation for the Reallocation part of the RRA procedure, if any data flows are satisfied. This is shown at block 690.

It will be appreciated that corresponding apparatus embodiments follow directly from the above techniques, including scheduling nodes (e.g., LTE eNodeBs) adapted (e.g., using programmed or hardware-configured processing circuits) to carry out these methods and to transmit data according to the allocations that result from these methods.

More particularly, it will be appreciated that the functions in the techniques and methods described above may be implemented using electronic data processing circuitry provided in a scheduling node, such as a base station. Each base station implementation, of course, also includes suitable radio circuitry for receiving and transmitting radio signals formatted in accordance with known formats and protocols, e.g., LTE formats and protocols.

Figure 7:
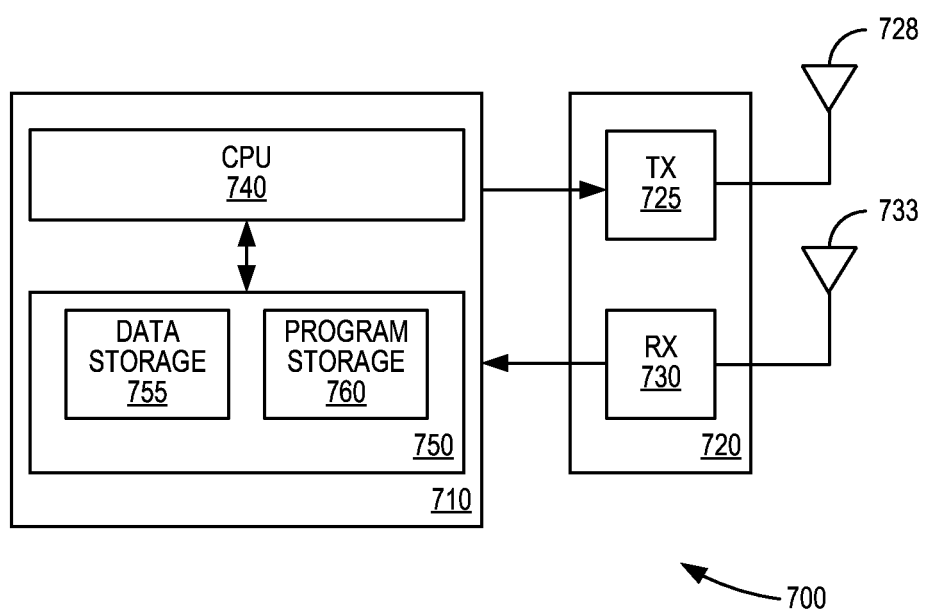
FIG. 7 is a block diagram illustrating components of an example base station apparatus configured to carry out one or more of the techniques described herein.

FIG. 7 illustrates features of an example base station 700 according to several embodiments of the present invention. Base station 700 comprises a transceiver 720 for communicating with mobile terminals as well as a processing circuit 710 for processing the signals transmitted and received by the transceiver 720. Transceiver 720 includes a transmitter 725 coupled to one or more transmit antennas 728 and receiver 730 coupled to one or more receive antennas 733. The same antenna(s) 728 and 733 may be used for both transmission and reception. Receiver 730 and transmitter 725 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 710 comprises one or more processors 740, hardware, firmware or a combination thereof, coupled to one or more memory devices 750 that make up a data storage memory 755 and a program storage memory 760. Memory 750 may comprise one or several types of memory such as read-only memory (ROM), random-access memory, cache memory, flash memory devices, optical storage devices, etc. Again, because the various details and engineering tradeoffs associated with the design of baseband processing circuitry for wireless base stations are well known and are unnecessary to a full understanding of the invention, additional details are not shown here.

Typical functions of the processing circuit 710 include modulation and coding of transmitted signals and the demodulation and decoding of received signals. In several embodiments of the present invention, processing circuit 710 is adapted, using suitable program code stored in program storage memory 760, for example, to carry out one of the techniques described above for dynamically allocating spatial and time-frequency resources among a plurality of data flows corresponding to a plurality of mobile terminals and a plurality of data services, where each data service has a minimum satisfaction constraint that specifies a minimum number of flows of the data service that must be satisfied by the allocating of resources. In particular, processing circuit 710 may be adapted, in some embodiments, to carry out one or both of the procedures illustrated in FIGS. 5 and 6, as well as any of the several variations thereof described above. Of course, it will be appreciated that not all of the steps of these techniques are necessarily performed in a single microprocessor or even in a single module, thus the term "processing circuit" should be understood to include circuits that include one or several processing elements or modules.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

With these and other variations and extensions in mind, those skilled in the art will appreciate that the foregoing description and the accompanying drawings represent non-limiting examples of the systems and apparatus taught herein for facilitating load balancing in a data packet network. As such, the present invention is not limited by the foregoing description and accompanying drawings.

What is claimed is:

1. A method, in a wireless network node, of dynamically allocating spatial and time-frequency resources among a plurality of data flows corresponding to a plurality of mobile terminals and a plurality of data services, each data service having a minimum satisfaction constraint that specifies a minimum number of flows of the data service that must be satisfied by the allocation of resources, the method comprising:

performing an initial allocation of available spatial and time-frequency resources to the data flows, based on channel state information for the mobile terminals, so as to define from the data flows, for each of a plurality of available time-frequency resource blocks, a spatial-multiplexing group for the time-frequency resource block, while ensuring that at least one of the data flows is satisfied by the allocation of resources;

from the data flows in the initial allocation, identifying a receiver flow set, a donor flow set, and an available resource set, the receiver flow set comprising data flows that have not been allocated sufficient resources to be satisfied, the donor flow set comprising data flows that have been allocated sufficient resources to be satisfied, and the available resource set comprising all resources assigned to the data flows in the donor flow set in the initial allocation;

selecting a data flow having a worst channel condition from the receiver flow set;

reallocating a time-frequency resource block selected from the available resource set to a spatial-multiplexing group that includes the selected data flow, based on a reallocation metric that accounts for (a) a reduction in the distance between flow data rates achievable by the most current allocation of resources and data rate requirements for data flows in the receiver flow set, and (b) a loss in total throughput caused by the reallocation of the identified time-frequency resource block, compared to the total throughput of the current allocation;

updating data rates of data flows in the receiver and donor flow sets and removing the selected data flow or other data flow from the receiver flow set if the selected data flow or the other data flow is satisfied after the reallocation;

removing the reallocated time-frequency resource block from the available resource set; and repeating said selecting, reallocating, updating, and removing operations until there are no data flows in the receiver flow set or until no time-frequency resource blocks can be reallocated without causing a data flow in the donor flow set to become unsatisfied.

2. The method of claim 1, wherein said initial allocation is a maximum-rate allocation that defines, for each of the plurality of available time-frequency resource blocks, a spatial-multiplexing group that leads to a highest possible data rate for the time-frequency resource block.

3. The method of claim 2, wherein said performing an initial allocation comprises:

identifying an auxiliary flow set and an available flow set, the auxiliary flow set and the available each initially comprising all of the data flows;

removing from the auxiliary flow set data flows for any data service that requires one-hundred percent of the data flows for that data services to be satisfied;

performing a first maximum-rate allocation of spatial and time-frequency resources to data flows from the available flow set; and, after determining that the minimum satisfaction constraint is not met:

selecting, from the auxiliary flow set, a data flow that requires a highest average number of spatial and time-frequency resources to be satisfied, in view of all possible spatial-multiplexing groups;

removing the identified data flow from the auxiliary flow set and the available flow set and removing all other data flows for the data service of the identified data flow from the auxiliary flow set if no further data flows for that data service can be removed from the available flow set without making it impossible for the minimum satisfaction constraint to be met by allocating resources to only data flows in the available flow set;

allocating spatial and time-frequency resources to data flows remaining in the available flow set, according to a maximum-rate allocation;

determining whether the auxiliary flow set is empty; and repeating the selecting, removing, allocating, and determining operations until the auxiliary flow set is empty.

4. The method of claim 1, further comprising transmitting data to at least a subset of the mobile terminals, according to the allocation in place when there are no data flows in the receiver flow set or when no time-frequency resource blocks can be reallocated without causing a data flow in the donor flow set to become unsatisfied.

5. A scheduling node in a wireless network node, wherein said scheduling node is adapted to dynamically allocate spatial and time-frequency resources among a plurality of data flows corresponding to a plurality of mobile terminals and a plurality of data services, each data service having a minimum satisfaction constraint that specifies a minimum number of flows of the data service that must be satisfied by the allocation of resources, said scheduling node comprising a processing circuit configured to:

perform an initial allocation of available spatial and time-frequency resources to the data flows, based on channel state information for the mobile terminals, so as to define from the data flows, for each of a plurality of available time-frequency resource blocks, a spatial-multiplexing group or the time-frequency resource block, while ensuring that at least one of the data flows is satisfied by the allocation of resources;

from the data flows in the initial allocation, identify a receiver flow set, a donor flow set, and an available resource set, the receiver flow set comprising data flows that have not been allocated sufficient resources to be satisfied, the donor flow set comprising data flows that have been allocated sufficient resources to be satisfied, and the available resource set comprising all resources assigned to the data flows in the donor flow set in the initial allocation;

select a data flow having a worst channel condition from the receiver flow set;

reallocate a time-frequency resource block selected from the available resource set to a spatial-multiplexing group that includes the selected data flow, based on a reallocation metric that accounts for (a) a reduction in the distance between flow data rates achievable by the most current allocation of resources and data rate requirements for data flows in the receiver flow set, and (b) a loss in total throughput caused by the reallocation of the identified time-frequency resource block, compared to the total throughput of the current allocation;

update data rates of data flows in the receiver and donor flow sets and remove the selected data flow or other data flow from the receiver flow set if the selected data flow or the other data flow is satisfied after the reallocation;

remove the reallocated time-frequency resource block from the available resource set; and repeat said selecting, reallocating, updating, and removing until there are no data flows in the receiver flow set or until no time-frequency resource blocks can be reallocated without causing a data flow in the donor flow set to become unsatisfied.

6. The scheduling node of claim 5, wherein the processing circuit is configured to perform the initial allocation by performing a maximum-rate allocation that defines, for each of the plurality of available time-frequency resource blocks, a spatial-multiplexing group that leads to a highest possible data rate for the time-frequency resource block.

7. The scheduling node of claim 6, wherein said processing circuit is configured to perform the initial allocation by:

identifying an auxiliary flow set and an available flow set, the auxiliary flow set and the available each initially comprising all of the data flows;

removing from the auxiliary flow set data flows for any data service that requires one-hundred percent of the data flows for that data services to be satisfied;

performing a first maximum-rate allocation of spatial and time-frequency resources to data flows from the available flow set; and, after determining that the minimum satisfaction constraint is not met:

selecting, from the auxiliary flow set, a data flow that requires a highest average number of spatial and time-frequency resources to be satisfied, in view of all possible spatial-multiplexing groups;

removing the identified data flow from the auxiliary flow set and the available flow set and removing all other data flows for the data service of the identified data flow from the auxiliary flow set if no further data flows for that data service can be removed from the available flow set without making it impossible for the minimum satisfaction constraint to be met by allocating resources to only data flows in the available flow set;

allocating spatial and time-frequency resources to data flows remaining in the available flow set, according to a maximum-rate allocation;

determining whether the auxiliary flow set is empty; and repeating the selecting, removing, allocating, and determining operations until the auxiliary flow set is empty.

8. The scheduling node of claim 5, wherein said processing circuit is further configured to schedule data transmission to at least a subset of the mobile terminals, according to the allocation in place when there are no data flows in the receiver flow set or when no time-frequency resource blocks can be reallocated without causing a data flow in the donor flow set to become unsatisfied.

9. A base station node adapted to dynamically allocate spatial and time-frequency resources among a plurality of data flows corresponding to a plurality of mobile terminals and a plurality of data services, each data service having a minimum satisfaction constraint that specifies a minimum number of flows of the data service that must be satisfied by the allocation of resource, the base station node comprising a transceiver circuit configured for radio communications with a plurality of mobile terminals and a processing circuit configured to processing the signals transmitted and received by the transceiver, wherein the processing circuit is further configured to:

perform an initial allocation of available spatial and time-frequency resources to the data flows, based on channel state information for the mobile terminals, so as to define from the data flows, for each of a plurality of available time-frequency resource blocks, a spatial-multiplexing group for the time-frequency resource block, while ensuring that at least one of the data flows is satisfied by the allocation of resources;

identify, from the data flows in the initial allocation, a receiver flow set, a donor flow set, and an available resource set, the receiver flow set comprising data flows that have not been allocated sufficient resources to be satisfied, the donor flow set comprising data flows that have been allocated more than sufficient resources to be satisfied, and the available resource set comprising all resources assigned to the data flows in the donor flow set in the initial allocation;

select a data flow having a worst channel condition from the receiver flow set;

reallocate a time-frequency resource block selected from the available resource set to a spatial-multiplexing group that includes the selected data flow, based on a reallocation metric that accounts for (a) a reduction in the distance between flow data rates achievable by the most current allocation of resources and data rate requirements for data flows in the receiver flow set, and (b) a loss in total throughput caused by the reallocation of the identified time-frequency resource block, compared to the total throughput of the current allocation;

update data rates of data flows in the receiver and donor flow sets and remove the selected data flow or other data flow from the receiver flow set if the selected data flow or the other data flow is satisfied after the reallocation;

remove the reallocated time-frequency resource block from the available resource set; and repeat said selecting, reallocating, updating, and removing operations until there are no data flows in the receiver flow set or until no time-frequency resource blocks can be reallocated without causing a data flow in the donor flow set to become unsatisfied.

10. The base station node of claim 9, wherein the processing circuit is configured to perform the initial allocation by performing a maximum-rate allocation that defines, for each of the plurality of available time-frequency resource blocks, a spatial-multiplexing group that leads to a highest possible data rate for the time-frequency resource block.

11. The base station node of claim 10, wherein said processing circuit is configured to perform the initial allocation by:

identifying an auxiliary flow set and an available flow set, the auxiliary flow set and the available each initially comprising all of the data flows;

removing from the auxiliary flow set data flows for any data service that requires one-hundred percent of the data flows for that data services to be satisfied;

performing a first maximum-rate allocation of spatial and time-frequency resources to data flows from the available flow set; and, after determining that the minimum satisfaction constraint is not met:

selecting, from the auxiliary flow set, a data flow that requires a highest average number of spatial and time-frequency resources to be satisfied, in view of all possible spatial-multiplexing groups;

removing the identified data flow from the auxiliary flow set and the available flow set and removing all other data flows for the data service of the identified data flow from the auxiliary flow set if no further data flows for that data service can be removed from the available flow set without making it impossible for the minimum satisfaction constraint to be met by allocating resources to only data flows in the available flow set;

allocating spatial and time-frequency resources to data flows remaining in the available flow set, according to a maximum-rate allocation;

determining whether the auxiliary flow set is empty; and repeating the selecting, removing, allocating, and determining operations until the auxiliary flow set is empty.

12. The base station node of claim 9, wherein said processing circuit is further configured to control said transceiver to transmit data to at least a subset of the mobile terminals, according to the allocation in place when there are no data flows in the receiver flow set or when no time-frequency resource blocks can be reallocated without causing a data flow in the donor flow set to become unsatisfied.

* * * * *

UNITED STATES PATENT AND TRADEMARK OFFICE
CERTIFICATE OF CORRECTION

PATENT NO. : 8,937,970 B2
APPLICATION NO. : 13/746930
DATED : January 20, 2015
INVENTOR(S) : Maciel et al.

It is certified that error appears in the above-identified patent and that said Letters Patent is hereby corrected as shown below:

In the Specification

In Column 9, Lines 60-62, delete "$j^* = \underset{j \in \mathcal{B}}{\mathrm{argmin}} \dfrac{\left( \dfrac{1}{G \cdot N} \sum_{z=G} \sum_{n \in =N} r_{z,n,j} \right)}{t_j}$" and insert -- $j^* = \underset{j \in \mathcal{B}}{\mathrm{arg\,min}} \dfrac{\left( \dfrac{1}{G \cdot N} \sum_{z \in G} \sum_{n \in \mathcal{N}} r_{z,n,j} \right)}{t_j}$ --, therefor.

Signed and Sealed this
Twenty-eighth Day of July, 2015

Michelle K. Lee
*Director of the United States Patent and Trademark Office*